United States Patent [19]
Ono

[11] Patent Number: 5,736,097
[45] Date of Patent: Apr. 7, 1998

[54] METHOD OF PREVENTING PITTING CORROSION

[75] Inventor: Yuichi Ono, Tokyo, Japan

[73] Assignee: Kurita Water Industries Ltd., Tokyo, Japan

[21] Appl. No.: 798,463

[22] Filed: Feb. 10, 1997

[30] Foreign Application Priority Data

Feb. 23, 1996 [JP] Japan .................................. 8-036465

[51] Int. Cl.$^6$ .............................. C23F 11/00; B08B 9/03; C02F 1/72
[52] U.S. Cl. ...................... 422/14; 134/22.11; 427/239; 210/759; 210/764; 210/765
[58] Field of Search ................ 422/7, 14; 134/22.11; 210/759, 764, 765; 427/239

[56] References Cited

U.S. PATENT DOCUMENTS 4,806,169 2/1989 Späne et al. ........................ 134/3

FOREIGN PATENT DOCUMENTS

| | | |
|---|---|---|
| 42-16521 | 9/1967 | Japan . |
| 45-32057 | 10/1970 | Japan . |
| 57-50560 | 10/1982 | Japan . |
| 3-288585 | 12/1991 | Japan . |
| 8-132093 | 5/1996 | Japan . |
| 927862 | 6/1980 | U.S.S.R. . |

*Primary Examiner*—Nina Bhat
*Attorney, Agent, or Firm*—Kanesaka & Takeuchi

[57] ABSTRACT

Hydrogen peroxide or a hydrogen peroxide producing agent is added to a water system having copper or copper alloy such as a thermal storage water system or a closed water system whereby the concentration of hydrogen peroxide in the circulating water becomes 1 to 200 mgH$_2$O$_2$/L. Hydrogen peroxide produces oxygen and oxygen works microbes directly so as to remove the microbial fouling and thus prevent the pitting corrosion in copper or its alloy due to microbial contamination.

6 Claims, 2 Drawing Sheets

METHOD OF PREVENTING PITTING CORROSION

FIELD OF THE INVENTION

The present invention relates to a method of preventing pitting corrosion and, more particularly, to a method of efficiently preventing pitting corrosion in a copper or copper alloy tube due to microbial contamination or fouling in a water system such as a thermal storage water system or a closed water system.

DESCRIPTION OF THE RELATED ART

In a thermal storage water system or a closed water system, water stored and circulated therein is added with only a small amount of supply water, and thus very slight amount of the water is replaced (with a ratio of about 10% per year). In such a water system, due to microbial contamination, pitting corrosion occurs on a surface of copper or copper alloy which is used as construction material of heat exchangers and pipe lines etc. and is in contact with water.

Conventionally, the presence of pitting corrosion is estimated by measuring the rest potential of the metal since copper or alloy becomes susceptible to pitting corrosion when its rest potential is over +150 mV (Ag/AgCl, saturated KCl solution conversion). When the potential rises up and the pitting corrosion is predicted, nonoxidizing microbial inhibitors(biocides) such as hydrazine being effective in lowering the rest potential, are added to the water system.

However, when the nonoxidizing microbial inhibitor such as hydrazine is added to a water system having very long retention time such as a thermal storage water system or a closed water system, microbes may be increased during the long operating term because of residual nutritive salts in the water.

To remove the slime thus produced by microbes and in the water system, it is known to add hydrogen peroxide to the system. For example, Japanese Patent Publication 42-16521 discloses a method of removing slime by adding 1 to 2% by weight of hydrogen peroxide to a water system in which the slime has been produced. Japanese Patent Publication 45-32057 discloses another method of removing slime by adding 0.1 to 2% by weight of hydrogen peroxide. In the above publications, the effect of hydrogen peroxide is to remove adhered slime, and accordingly the hydrogen peroxide is used therefore in high concentration.

Japanese Patent Publication 57-50560 discloses a method of preventing the accretion of slime in an open circulating cooling water system by adding hydrogen peroxide at low concentration. However, the effect of hydrogen peroxide disclosed in this publication is to prevent the accretion of slime in the open circulating cooling water system, and nothing is described therein that the hydrogen peroxide is used for preventing pitting corrosion of copper or its alloy of a thermal storage water system or a closed water system.

As mentioned above, nonoxidizing substances are conventionally used as pitting corrosion inhibitors and there was no idea of using hydrogen peroxide, which has been generally known as oxidizer, to prevent pitting corrosion in copper or its alloy.

OBJECT AND SUMMARY OF THE INVENTION

It is an object of the present invention to solve problems as mentioned above and to provide a method of efficiently preventing pitting corrosion of copper or copper alloy due to microbial contamination in a water system such as a thermal storage water system or a closed water system. It is another object of the present invention to provide a method of preventing pitting corrosion in copper or its alloy without proliferating microbes due to residual nutritive salts, and without increasing the impurities in the water as well.

The method of preventing pitting corrosion according to the present invention comprises adding hydrogen peroxide or a hydrogen peroxide producing agent to a circulating water system having copper or its alloy such as a thermal storage water system or a closed water system so that the concentration of hydrogen peroxide in the system becomes 1 to 200 $mgH_2O_2/L$.

In the present invention the hydrogen peroxide producing agent is defined to be an agent which produces hydrogen peroxide when it is added to water. The hydrogen peroxide producing agent is for example at least one of peroxocarbonates, peroxoborates, peroxoacetates and peroxophosphates, wherein the salt my be water soluble sodium salt and potassium salt etc.

When hydrogen peroxide is decomposed in the water system, only water and oxygen are produced whereby proliferation of microbes due to residual nutritive salts is prevented, and impurities do not increase in their concentration in the water system.

Sodium peroxocorbonate or sodium peroxoborate produces not only hydrogen peroxide but sodium carbonate or sodium borate which remains in the water system. The carbonate or borate has buffer action and corrosion inhibition to metals including copper and its alloy. Furthermore, such salt is not nutritive to microbes.

In the present invention, the oxidizing action of the hydrogen peroxide works for removing microbes and for disinfection by oxidation of protein, whereby the rest potential of copper or its alloy is kept low and pitting corrosion thereof is prevented.

In the present invention the hydrogen peroxide which is added to or produced in the water system is effective, even when it is in low concentration from 1 to 200 $mgH_2O_2/L$ in the circulating water. In general, the amount of microbes in a thermal storage water system or a closed water system is less than that in an open circulating cooling water system having a cooling tower. Accordingly, the hydrogen peroxide can remove microbes and prevent pitting corrosion in copper or its alloy even in low concentration from 1 to 200 $mgH_2O_2/L$. It should be noted that the hydrogen peroxide is used in high concentration from 1,000 to 30,000 $mgH_2O_2/L$ in the conventional method.

Using the oxidizing agent (the hydrogen peroxide or the hydrogen peroxide producing agent) in low concentration contributes to the reduction of rising of the potential of copper or its alloy by the oxidizing agent itself and to the possibility of the reduction in the cost for removing microbes. In addition, since the concentration of impurities in the water system is kept low, the blow water therefrom is allowed to be discharged without any treating process such as dilution.

DESCRIPTION OF THE PREFERRED EMBODIMENTS

According to the present invention, hydrogen peroxide or the hydrogen peroxide producing agent is added to circulating water held in a thermal storage water system or a closed water system such that the concentration of hydrogen oxide in the water system becomes 1 to 200 $mgH_2O_2/L$, preferably 10 to 150 $mgH_2O_2/L$, more preferably 30 to 120 $mgH_2O_2/L$.

When the concentration of the hydrogen peroxide added to or produced in the circulating water is less than 1 $mgH_2O_2/L$, pitting corrosion is not prevented effectively. When the concentration exceeds 200 $mgH_2O_2/L$, the effect of preventing pitting corrosion is saturated, so that the concentration is preferably less than 200 $mgH_2O_2/L$ to decrease the cost of the treatment.

The way of adding the hydrogen peroxide or the hydrogen peroxide producing agent to the water system may be any one of such ways that the concentration of the hydrogen peroxide added or produced in the circulating water becomes in a range from 1 to 200 $mgH_2O_2/L$. The hydrogen peroxide or the agent may be intermittently added to the circulating water or continuously supplied to the circulating water. In case of intermittently adding hydrogen peroxide or the hydrogen peroxide producing agent to the water system, hydrogen peroxide or the agent may be added at regular intervals for example once in 1–6 (preferably 2–5) months or may be added in such a manner that the rest potential of copper or its alloy is kept at +150 mV or below, preferably +100 mV or below, by monitoring the rest potential of a copper or copper alloy tube. In case of continuously supplying hydrogen peroxide or the hydrogen peroxide producing agent, the amount of hydrogen peroxide or the agent to be added may be controlled in such a manner that the rest potential of the copper or copper alloy tube is kept at +150 mV or below, preferably +100 mV, by monitoring of the rest potential.

In case of intermittently adding hydrogen peroxide or the hydrogen peroxide producing agent to the water system, it is preferable that the concentration of $H_2O_2$ in the water system immediately after the addition of hydrogen peroxide or the agent is in a range from 50 to 200 $mgH_2O_2/L$. In case of continuously adding hydrogen peroxide or the hydrogen peroxide producing agent to the water system, it is preferable that the concentration of $H_2O_2$ in the water system is always in a range from 1 to 50 $mgH_2O_2/L$.

Hydrogen peroxide is preferably added in a state of an aqueous solution of 1 to 35% by weight concentration. The peroxocarbonate salt is preferably added in a state of an aqueous solution of 5 to 10% by weight and the peroxoborate in a state of an aqueous solution of 10 to 20%.

In the present invention copper may be alloyed. The copper alloy may be for example brass or nickel copper alloy.

EXAMPLE 1

Figure 1:
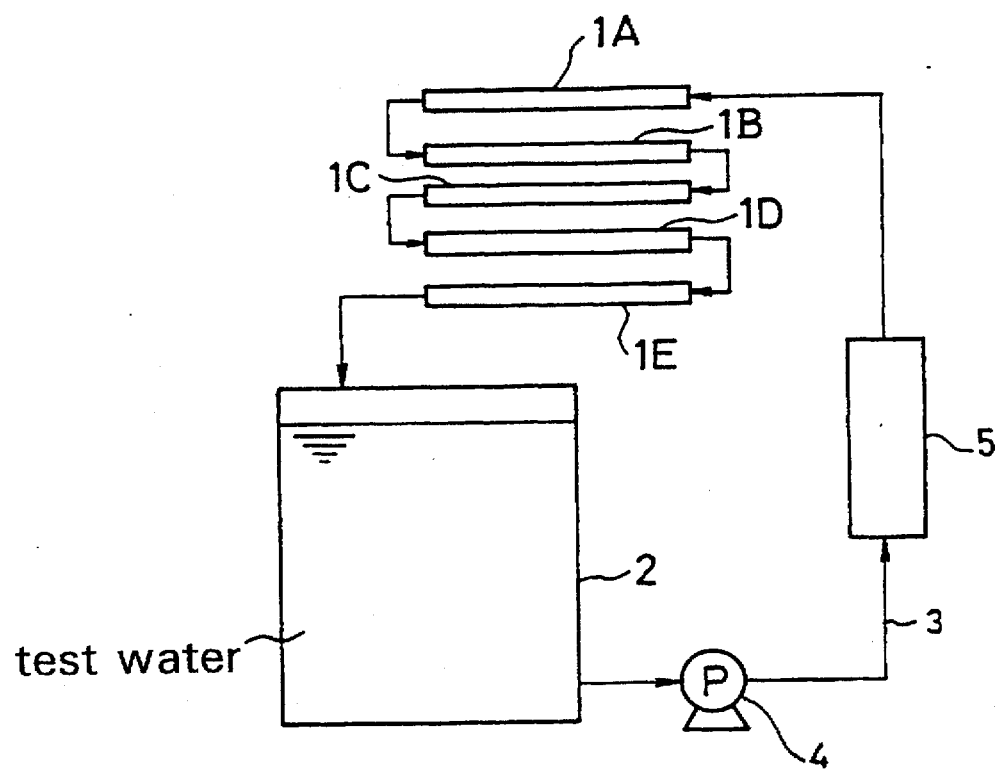
FIG. 1 is a schematic diagram showing a circulation testing device used in embodiments.

Experiments were conducted for examining the effects of adding hydrogen peroxide, with using a circulation testing device having five copper tubes (13 mm in inner diameter ×50 cm in length) 1A, 1B, 1C, 1D, 1E arranged in series, a test water tank 2, and circulating piping 3 provided with a pump 4 and a flowmeter 5 as shown in FIG. 1. Test water (100 liters of well water) stored in the test water tank 2 was circulated at room temperature at a flow velocity of 0.3 m/s via the circulating piping 3.

When the potential of the copper tubes 1A through 1E rose to +180 mV after approximately 170 hours from the start of circulating the water, an aqueous hydrogen peroxide solution of 35% by weight was added to the test water tank 2 at once and only one time in such a manner that the concentration became 100 $mgH_2O_2/L$. The water was kept to be circulated, and the copper tubes were examined in their rest potential values and the average of the five tubes was obtained with time. The results are shown in Table 1 and FIG. 2. The number of bacteria in the test water and on the surfaces of the copper tubes were also measured with time, and the results are shown in Table 1.

TABLE 1

| Concentration of $H_2O_2$: 100 mg/L added as hydrogen peroxide | | | |
|---|---|---|---|
| Example 1 | Before adding hydrogen peroxide | After 2 hr. from adding hydrogen peroxide | After 24 hr from adding hydrogen peroxide |
| Number of bacteria in water (CFU/ml) | $3.1 \times 10^2$ | less than $1 \times 10^1$ | $1.1 \times 10^2$ |
| Number of bacteria on surface of copper tube (CFU/cm$^2$) | $1.1 \times 10^4$ | $1.8 \times 10^2$ | $1.9 \times 10^4$ |
| Rest potential of copper tube (mV. Ag/AgCl) | 180 | 100 | 60 |

Figure 2:
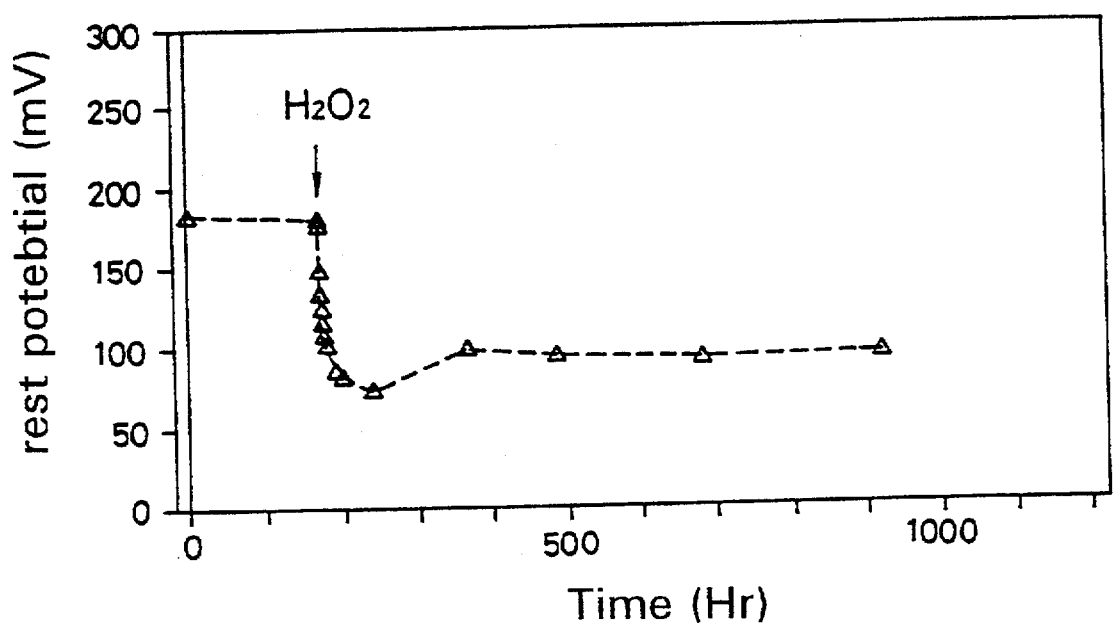
FIG. 2 is a graph showing transition in the spontaneous potential value of copper tubes according to Embodiment 1.

As clearly shown in Table 1 and FIG. 2, the number of bacteria in the water and on the surfaces of the copper tubes started to decrease soon after the hydrogen peroxide or the hydrogen peroxide solution was added, and the potential of the copper tube (Ag/AgCl, saturated KCl solution conversion) fell within a short time to less than +100 mV from +180 mV.

EXAMPLES 2, 3, 4, 5 and COMPARATIVE EXAMPLE 1

The test water was circulated in the same manner the Embodiment 1, but adding hydrogen peroxide or the hydrogen peroxide producing agent solution such that the concentration of $H_2O_2$ in the water becomes as follows:

Embodiment 2 concentration of $H_2O_2$: 200 mg/L by adding sodium peroxoborate

Embodiment 3 concentration of $H_2O_2$: 50 mg/L by adding hydrogen peroxide

Embodiment 4 concentration of $H_2O_2$: 10 mg/L by adding sodium peroxocarbonate Embodiment 5 concentration of $H_2O_2$: 1 mg/L by adding hydrogen peroxide Comparative Example 1 concentration of $H_2O_2$: 0.5 mg/L by adding hydrogen peroxide The results of the measured potential of the copper tubes and of the measured number of bacteria in Embodiments 2 through 5 and Comparative Example 1 are shown in Tables 2 through 6.

TABLE 2

| Concentration of $H_2O_2$: 200 mg/L added as sodium peroxoborate | | | |
|---|---|---|---|
| Example 2 | Before adding hydrogen peroxide | After 2 hr. from adding hydrogen peroxide | After 24 hr from adding hydrogen peroxide |
| Number of bacteria in water (CFU/ml) | $1.5 \times 10^2$ | less than $1 \times 10^1$ | $4.7 \times 10^3$ |
| Number of bacteria on surface of copper tube (CFU/cm$^2$) | $9.0 \times 10^5$ | $1.0 \times 10^2$ | $7.2 \times 10^3$ |
| Rest potential of copper tube (mV. Ag/AgCl) | 160 | 140 | 60 |

TABLE 3

Concentration of $H_2O_2$: 50 mg/L added as hydrogen peroxide

| Example 3 | Before adding hydrogen peroxide | After 2 hr. from adding hydrogen peroxide | After 24 hr from adding hydrogen peroxide |
|---|---|---|---|
| Number of bacteria in water (CFU/ml) | $6.1 \times 10^2$ | less than $1 \times 10^1$ | $6.4 \times 10^2$ |
| Number of bacteria on surface of copper tube (CFU/cm$^2$) | $1.3 \times 10^6$ | $1.0 \times 10^2$ | $1.8 \times 10^6$ |
| Rest potential of copper tube (mV. Ag/AgCl) | 160 | 100 | 80 |

TABLE 4

Concentration of $H_2O_2$: 10 mg/L added as sodium peroxocarbonate

| Example 4 | Before adding hydrogen peroxide | After 2 hr. from adding hydrogen peroxide | After 24 hr from adding hydrogen peroxide |
|---|---|---|---|
| Number of bacteria in water (CFU/ml) | $2.0 \times 10^3$ | less than $1 \times 10^1$ | $5.4 \times 10^3$ |
| Number of bacteria on surface of copper tube (CFU/cm$^2$) | $5.4 \times 10^5$ | $8.2 \times 10^3$ | $2.3 \times 10^4$ |
| Rest potential of copper tube (mV. Ag/AgCl) | 150 | 140 | 60 |

TABLE 5

Concentration of $H_2O_2$: 10 mg/L added as hydrogen peroxide

| Example 5 | Before adding hydrogen peroxide | After 2 hr. from adding hydrogen peroxide | After 24 hr from adding hydrogen peroxide |
|---|---|---|---|
| Number of bacteria in water (CFU/ml) | $1.6 \times 10^3$ | $1.8 \times 10^2$ | $2.2 \times 10^2$ |
| Number of bacteria on surface of copper tube (CFU/cm$^2$) | $3.2 \times 10^5$ | $6.4 \times 10^3$ | $1.2 \times 10^5$ |
| Rest potential of copper tube (mV. Ag/AgCl) | 160 | 150 | 100 |

TABLE 6

Concentration of $H_2O_2$: 0.5 mg/L added as hydrogen peroxide

| Comparative Example 1 | Before adding hydrogen peroxide | After 2 hr. from adding hydrogen peroxide | After 24 hr from adding hydrogen peroxide |
|---|---|---|---|
| Number of bacteria in water (CFU/ml) | $2.2 \times 10^3$ | $2.4 \times 10^3$ | $4.0 \times 10^3$ |
| Number of bacteria on surface of copper tube (CFU/cm$^2$) | $5.4 \times 10^5$ | $3.0 \times 10^4$ | $2.8 \times 10^5$ |

TABLE 6-continued

Concentration of $H_2O_2$: 0.5 mg/L added as hydrogen peroxide

| Comparative Example 1 | Before adding hydrogen peroxide | After 2 hr. from adding hydrogen peroxide | After 24 hr from adding hydrogen peroxide |
|---|---|---|---|
| Rest potential of copper tube (mV. Ag/AgCl) | 170 | 150 | 150 |

After 1.5 months from adding hydrogen peroxide or the agent, the inner surfaces of the cooper tubes were observed visually. As a result of this observation no pitting corrosion was found in Examples 1 through 5, while pitting corrosion was slightly generated in Comparative Example 1. This shows that the method of the present invention is quite effective to prevent pitting corrosion of copper.

What is claimed is:

1. A method of preventing pitting corrosion in a thermal storage water system or a closed water system, which is provided with copper or a copper alloy comprising: adding hydrogen peroxide or a hydrogen peroxide producing agent to circulating water in the thermal storage water system or the closed water system so that a concentration of hydrogen peroxide in the circulating water becomes 1 to 200 mgH$_2$O$_2$/L, to thereby prevent pitting corrosion of copper or the copper alloy in the thermal storage water system or the closed water system.

2. A method according to claim 1, wherein the hydrogen peroxide producing agent is at least one compound selected from the group consisting of peroxocarbonates, peroxoacetates, peroxoborates and peroxophosphates.

3. A method according to claim 1, wherein the hydrogen peroxide is added to become 10 to 150 mgH$_2$O$_2$/L in its concentration in the circulating water.

4. A method according to claim 1, wherein the hydrogen peroxide or the hydrogen peroxide producing agent is intermittently added to the circulating water.

5. A method of preventing pitting corrosion, comprising:

providing a thermal storage water system or a closed water system, which is provided with a copper or copper alloy tube; and adding hydrogen peroxide or a hydrogen peroxide producing agent to circulating water in the thermal storage water system or the closed water system so that a concentration of hydrogen peroxide in the circulating water becomes 1 to 200 mgH$_2$O$_2$/L and a rest potential of the copper or copper alloy tube becomes below +150 mV, to thereby prevent pitting corrosion of the copper or copper alloy tube in the thermal storage water system or the closed water system.

6. A method according to claim 5, wherein the hydrogen peroxide producing agent is at least one compound selected from the group consisting of peroxocarbonates, peroxoacetates, peroxoborates and peroxophosphates.

* * * * *

UNITED STATES PATENT AND TRADEMARK OFFICE
CERTIFICATE OF CORRECTION

PATENT NO.   : 5,736,097
DATED        : April 7, 1998
INVENTOR(S)  : Yuichi Ono

It is certified that error appears in the above-indentified patent and that said Letters Patent is hereby corrected as shown below:

Column 4, table 1, number of bacteria on surface of copper tube ($CFU/cm^2$), "$1.1 \times 10^4$" should be --$1.1 \times 10^6$--; and "$1.9 \times 10^4$" should be --$1.9 \times 10^6$--.

Signed and Sealed this

Eighteenth Day of May, 1999

Attest:

Attesting Officer

Q. TODD DICKINSON

Acting Commissioner of Patents and Trademarks